(12) United States Patent
Wu et al.

(10) Patent No.: US 11,624,654 B1
(45) Date of Patent: Apr. 11, 2023

(54) COMPACT MODULATION TRANSFER FUNCTION COLORIMETER

(71) Applicant: ML Optic Corp, Redmond, WA (US)

(72) Inventors: Pengfei Wu, Bellevue, WA (US); Wei Zhou, Sammamish, WA (US)

(73) Assignee: ML Optic Corp., Redmond, WA (US)

( * ) Notice: Subject to any disclaimer, the term of this patent is extended or adjusted under 35 U.S.C. 154(b) by 0 days.

(21) Appl. No.: 17/987,268

(22) Filed: Nov. 15, 2022

(51) Int. Cl.
  *G01J 3/50* (2006.01)
  *G01J 3/28* (2006.01)
  *G01J 3/02* (2006.01)
  *G01J 3/14* (2006.01)

(52) U.S. Cl.
  CPC ............... *G01J 3/50* (2013.01); *G01J 3/021* (2013.01); *G01J 3/0218* (2013.01); *G01J 3/14* (2013.01); *G01J 3/2823* (2013.01)

(58) Field of Classification Search
  CPC .... G01J 3/524; G01J 3/46; G01J 3/50; H04N 13/00; G02B 27/01
  See application file for complete search history.

(56) References Cited

FOREIGN PATENT DOCUMENTS

| CN | 216978136 U | * | 7/2022 | |
| IL | 279945 A | * | 2/2021 | |
| WO | WO-2019235372 A1 | * | 12/2019 | ............ G01J 3/2823 |

OTHER PUBLICATIONS

Martin Hunt, "Imaging tristimulus colorimeter for the evaluation of color in printed textiles", 1999, SPIE (Year: 1999).*

* cited by examiner

*Primary Examiner* — Maurice C Smith
(74) *Attorney, Agent, or Firm* — Tracy Jong Law Firm; Tracy P. Jong; Cheng Ning Jong

(57) ABSTRACT

A colorimeter configured to receive central rays and marginal rays, the colorimeter including an image sensor configured for receiving the central rays to produce a first image; a spectrometer configured for receiving the marginal rays to produce a second image; and at least one optical device configured to reflect at least a portion of the marginal rays through a light path to the spectrometer, wherein the first image and the second image are aggregated to produce a total image that is more extensive than the first image.

10 Claims, 16 Drawing Sheets

ROI with single-field scanning

ROI with two-field scanning

| Positive VID | Cone angle | Negative VID | Cone angle |
|---|---|---|---|
| 0.2m | 0.338579129 | -0.2m | 0.622860196 |
| 0.5m | 0.423865837 | -0.5m | 0.537578459 |
| 1m | 0.45229434 | -1m | 0.509150666 |
| 2m | 0.46650851 | -2m | 0.494936674 |
| 5m | 0.475036984 | -5m | 0.48640825 |
| 10m | 0.477879804 | -10m | 0.483565437 |
| 20m | 0.479301213 | -20m | 0.482144029 |
| 50m | 0.480154058 | -50m | 0.481291185 |
| 100m | 0.48043834 | -100m | 0.481006903 |
| 200m | 0.480580481 | -200m | 0.480864762 |
| Infinity | 0.480722621 | Infinity | 0.480722621 |

| VID or object distances (mm) | 200 | 300 | 1000 | 3500 | infinity | -300 | -200 |
|---|---|---|---|---|---|---|---|
| Image semi-dia. (mm) | 3.111 | 3.110 | 3.108 | 3.109 | 3.109 | 3.109 | 3.108 |

FIG. 16

| | | | | | | |
|---|---|---|---|---|---|---|
| Light source | Wavelength (μm) | | 0.465 | 0.521 | 0.625 | |
| | Chromaticity coordinates | x | 0.135502671 | 0.082053395 | 0.700605061 | |
| | | y | 0.039879121 | 0.834090315 | 0.299300699 | |
| | Luminance | Y | 2.500E+01 | 2.500E+01 | 2.500E+01 | |
| Color detector | Field angles (deg) | | 0, 1, 2, 3, 4, 5 | 0, 1, 2, 3, 4, 5 | 0, 1, 2, 3, 4, 5 | |
| | Chromaticity coordinates | x | 0.135518864 | 0.082204324 | 0.700605169 | |
| | | y | 0.039881949 | 0.834111838 | 0.299301593 | |
| | Luminance | Y | 2.500E+01 | 2.500E+01 | 2.500E+01 | |
| Color Accuracy | Chromaticity coordinates | Δx | 1.62E-05 | 1.02E-05 | 8.92E-07 | |
| | | Δy | 2.828E-06 | 2.1523E-05 | 8.94E-07 | |
| | Luminance | ΔY/Y | 0 | 0 | 0 | |

FIG. 17

| Light Source (D65 white) | | CIE 1931 Tristimulus with three wavelengths | 0.400 μm | | | | |
| --- | --- | --- | --- | --- | --- | --- | --- |
| | | | 0.550 μm | | | | x 0.3127159907 |
| | | | 0.700 μm | | | | y 0.3290001481 |
| | | | | | | | Y 2.5000E+01 |
| | Field angles (deg) | | 0 | 1 | 2 | 3 | 5 |
| Color Detector | Chromaticity coordinates | x | 0.3127631S8 | 0.3127874S9 | 0.3126882S8 | 0.31273877 | 0.312837393 |
| | | y | 0.329078947 | 0.329741056 | 0.330889093 | 0.328546964 | 0.329032258 |
| | Luminance | Y | 2.5012E+01 | 2.5095E+01 | 2.5270E+01 | 2.4937E+01 | 2.4992E+01 |
| Color Accuracy | Chromaticity coordinates | Δx | 4.73E-05 | 7.16E-05 | 2.77E-05 | 2.29E-05 | 1.21E-04 |
| | | Δy | 7.75E-05 | 7.40E-04 | 1.89E-03 | 4.55E-04 | 3.08E-05 |
| | Luminance | ΔY/Y | 4.80E-04 | 3.80E-03 | 1.08E-02 | 2.52E-03 | 3.20E-04 |

*FIG. 18*

| Light Source (D65 white) | | CIE 1931 Tristimulus with a broadband spectrum | 0.400 - 0.700 μm (100 wavelengths) | | | | Chromaticity coordinates | x | 0.312715907 |
| --- | --- | --- | --- | --- | --- | --- | --- | --- | --- |
| | | | | | | | | y | 0.329001481 |
| | | | | | | | Luminance | Y | 2.5000E+01 |
| | Field angles (deg) | | 0 | 1 | 2 | 3 | | | 5 |
| Color Detector | Chromaticity coordinates | x | 0.31266456 | 0.312450645 | 0.312187418 | 0.312639747 | | | 0.312574062 |
| | | y | 0.329252238 | 0.328639116 | 0.328244275 | 0.328949099 | | | 0.329163924 |
| | Luminance | Y | 2.5014E+01 | 2.4974E+01 | 2.4940E+01 | 2.5005E+01 | | | 2.5002E+01 |
| Color Accuracy | Chromaticity coordinates | Δx | 5.13E-05 | 2.65E-04 | 5.28E-04 | 7.62E-05 | | | 1.42E-04 |
| | | Δy | 2.51E-04 | 3.62E-04 | 7.57E-04 | 5.24E-05 | | | 1.62E-04 |
| | Luminance | ΔY/Y | 5.60E-04 | 1.04E-03 | 2.40E-03 | 2.00E-04 | | | 8.00E-05 |

FIG. 19

COMPACT MODULATION TRANSFER FUNCTION COLORIMETER

BACKGROUND OF THE INVENTION

1. The Field of the Invention

The present invention relates to a colorimeter. More specifically, the present invention is directed to a compact modulation transfer function (MTF) colorimeter.

2. Background Art

A colorimeter is one of the most important instruments in the display industry including emerging eXtended Reality (XR) displays which encompass augmented reality (AR), virtual reality (VR), and mixed reality (MR) technologies using near eye display (NED) devices.

However, currently available colorimeters are bulky and very slow in performance. Due to the nature of small sizes of the NED devices, optical metrology systems must collect light emitted from a small aperture or tiny eyebox locations of a micro-optic device such as microLED panels, waveguides and holographic gratings, in a wide range of angles without contacting the products. Therefore, new methods are currently solicited specially to address the geometric challenge in an NED evaluation process.

Based on the well-established Four Color Matrix Method, study on color calibrations for a variety of displays has concluded that a correction matrix should be obtained for each display type because one matrix is effective only for small variations of spectra within each type. The NED devices use laser diodes or microLEDs as light sources of which the wavelengths can drift over the time or due to the changes of driven electric currents or ambient temperature. Therefore, a colorimeter with the capability of quick or real time color calibration is important for precise color measurements.

Besides the color measurements, high optical imaging quality is another critical specification in the design, manufacturing and user experience of the NED products. Imaging quality and contrast can be defined by measuring the modulation transfer function (MTF) from the displays. As a MTF metrology device, the optical performance of the optical system needs be near diffraction limit to ensure the measured MTF values are accurate for the NED devices. Overall, the XR display industry demands for techniques integrated with multiple capabilities in a single compact design, enabling fast and precise measurements of chromaticity, luminance, and MTF features.

Most commercially-available colorimeters are based on XYZ filter technology. XYZ filters are required to be recalibrated for different types of light sources or targets. These colorimeters produce lower accuracy due to errors of XYZ filters and spectral uncertainty of different light sources. In another example of a conventional colorimeter, a spectroradiometer is also utilized to produce enhanced accuracies compared to results obtained without the use of the spectroradiometer. These colorimeters are typically bulky in their form factor, costly, very slow in yielding results as each cycle of data collection involves switching on/off the devices with XYZ and neutral density (ND) filters, one by one, and do not have the capability of modulation transfer function (MTF) measurements. They are further unable to perform color calibration in real time while acquiring images, therefore their throughput is limited. In addition, for an upgraded colorimeter using XYZ filters and spectroradiometer, a beam splitter or a flip mirror is commonly used to pick up light from an image center to be sent to a spectroradiometer for color calibration. The beam splitter can cause light loss, color distortion as well as image degradation. The flip mirror includes mechanical moving parts involving risks including optical misalignment, worn issue as well as mechanical failure.

There exists a need for a colorimeter capable of extending its image capture area to an area previously not captured and analyzed due the differences in the shape of the incoming light beam and the shape of an image sensor useful for capturing the light beam. There also exists a need for a colorimeter capable of modulation transfer function (MTF) measurements.

SUMMARY OF THE INVENTION

In accordance with the present invention, there is provided a colorimeter configured to receive central rays and marginal rays, the colorimeter including:
  (a) an image sensor configured for receiving the central rays to produce a first image; and
  (b) at least one optical device configured to reflect at least a portion of the marginal rays through a light path to a spectrometer to produce a second image,
wherein the first image and the second image are aggregated to produce a total image that is more extensive than the first image.

In one embodiment, the spectrometer is adapted to receive the marginal rays at a field angle of up to about 10 degrees field of view (FOV). In one embodiment, the at least one optical device is a device selected from the group consisting of a mirror and a prism. In one embodiment, the light path includes an optical fiber. In one embodiment, the colorimeter includes an entrance pupil having a light transmitting area and the image sensor includes a light receiving area, wherein the shape of the light transmitting area is different from the shape of the light receiving area. In one embodiment, the shape of the light transmitting area is round and the shape of the light receiving area is rectangular.

An object of the present invention is to provide a compact colorimeter.

Another object of the present invention is to provide a compact colorimeter including a Modulation Transfer Function (MTF) feature.

Another object of the present invention is to provide a colorimeter capable of high throughput.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 16 depicts properties of a lens that is telecentric in imaging space.

FIG. 17 depicts a color simulation using ZEMAX® software with single wavelength.

FIG. 18 depicts results of D65 simulation using ZEMAX® software with RGB wavelengths as color primaries.

FIG. 19 depicts results of D65 simulation using ZEMAX® with a broadband spectrum.

PARTS LIST

2—colorimeter
4—barrel
5—body
6—entrance pupil
8—view allowed by entrance pupil
10—image sensor
12—prism or mirror
14—lens system
16—central rays
18—marginal rays
20—light path, e.g., optical fiber
22—incident rays
24—height of colorimeter
26—length of colorimeter
28—height of image sensor
30—spread of marginal rays
32—area not normally imaged
34—redirected marginal rays
36—diffraction limit
38—fiber core

PARTICULAR ADVANTAGES OF THE INVENTION

The present colorimeter is configured to receive more extensive light rays using one or more optical fiber, thereby providing precise measurements of both color chromaticity and luminance, in addition to MTF measurements of optical imaging. In some embodiments, microprisms are used to pick up one field angle, e.g., 5 degrees, or two field angels, e.g., 5 degrees and −5 degrees or even more field angles around the imaging sensor to increase the sensitivity and accuracy of color measurement.

Light beams are cast in a circular form at an image plane while a conventional image sensor is normally fabricated in the form of a rectangle, e.g., square. As such, plenty of marginal light is generally not cast onto the image sensor. Instead of harvesting light from the image center at the image plane, the present modulation transfer function (MFT) colorimeter includes a means of harvesting marginal light beams outside of such image center for color calibration.

The present colorimeter provides not only color measurement capability but also modulation transfer function (MFT) capability. As light rays at field angles outside of the image center can be captured, the sensitivity and color accuracy produced using the present colorimeter is comparable to an upgraded colorimeter with spectroradiometer. Optical images obtained through the present colorimeter for MTF can be extended close to the diffraction limit.

The present colorimeter has no alignment issues as there are no moving parts inside the device. For the same reason, the procurement cost for the present colorimeter is low, the present colorimeter is very compact and lightweight and hence can be mounted on any motion stages, hexapods or robotic arms, etc. The use of a present colorimeter for MTF and color measurements results in high through put as these measurements can be performed without involving conventional color measurement practices of a conventional colorimeter. The present colorimeter is capable of both coarse scanning or fine colorimeter imaging.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
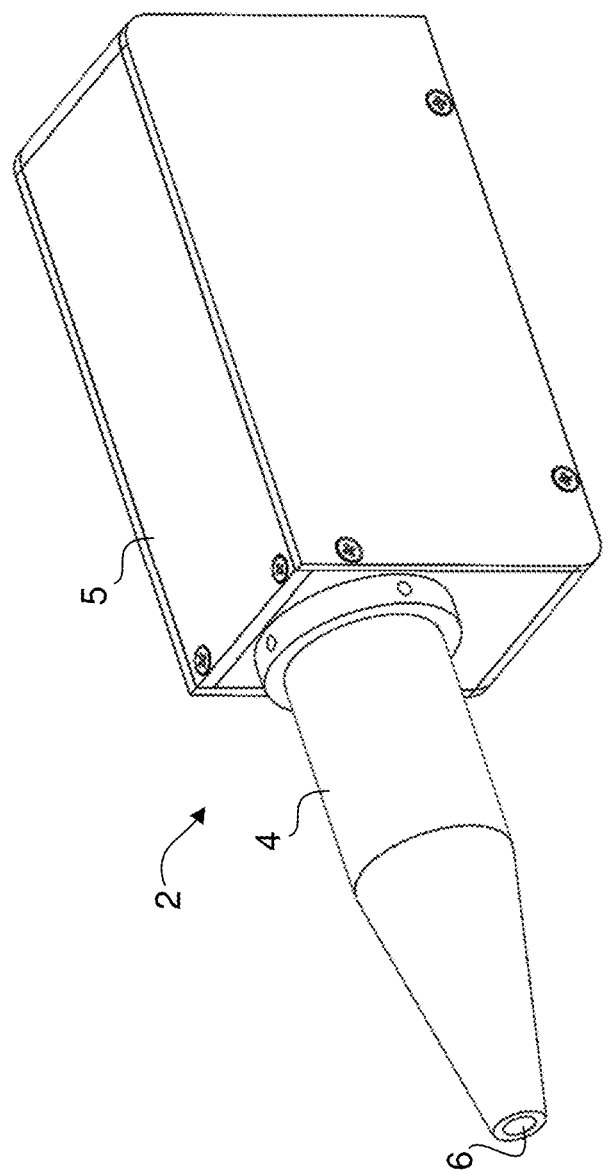
FIG. 1 is a top front perspective view of a present colorimeter.
Figure 2:
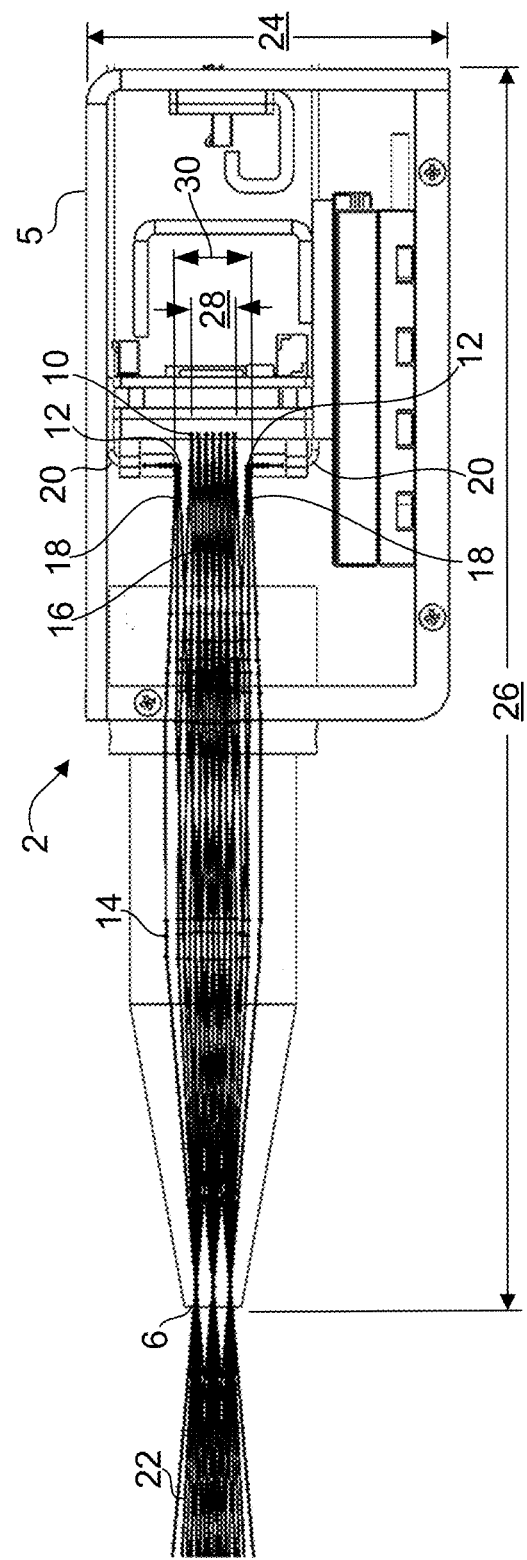
FIG. 2 is a side cross-sectional view of a present colorimeter, depicting an internal imaging path of the present colorimeter.
Figure 3:
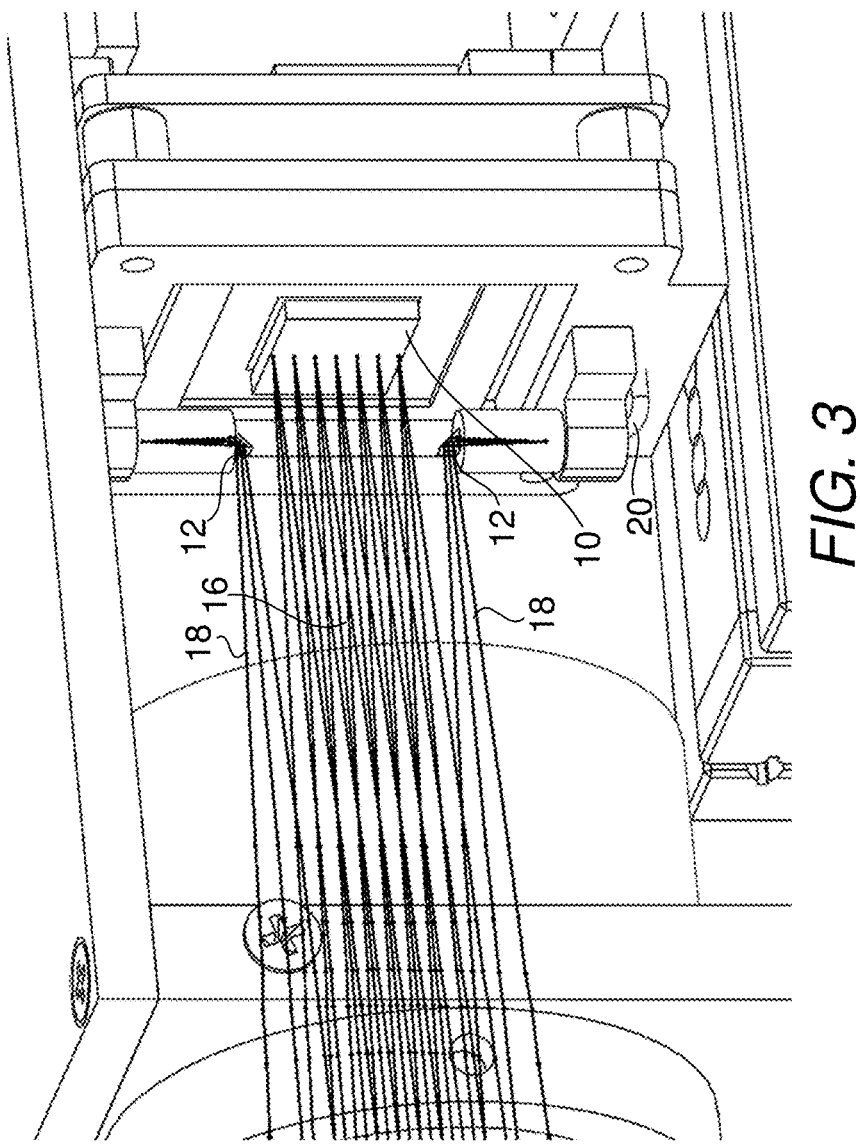
FIG. 3 is a partial top side perspective view of the imaging portion of the present colorimeter.
Figure 4:
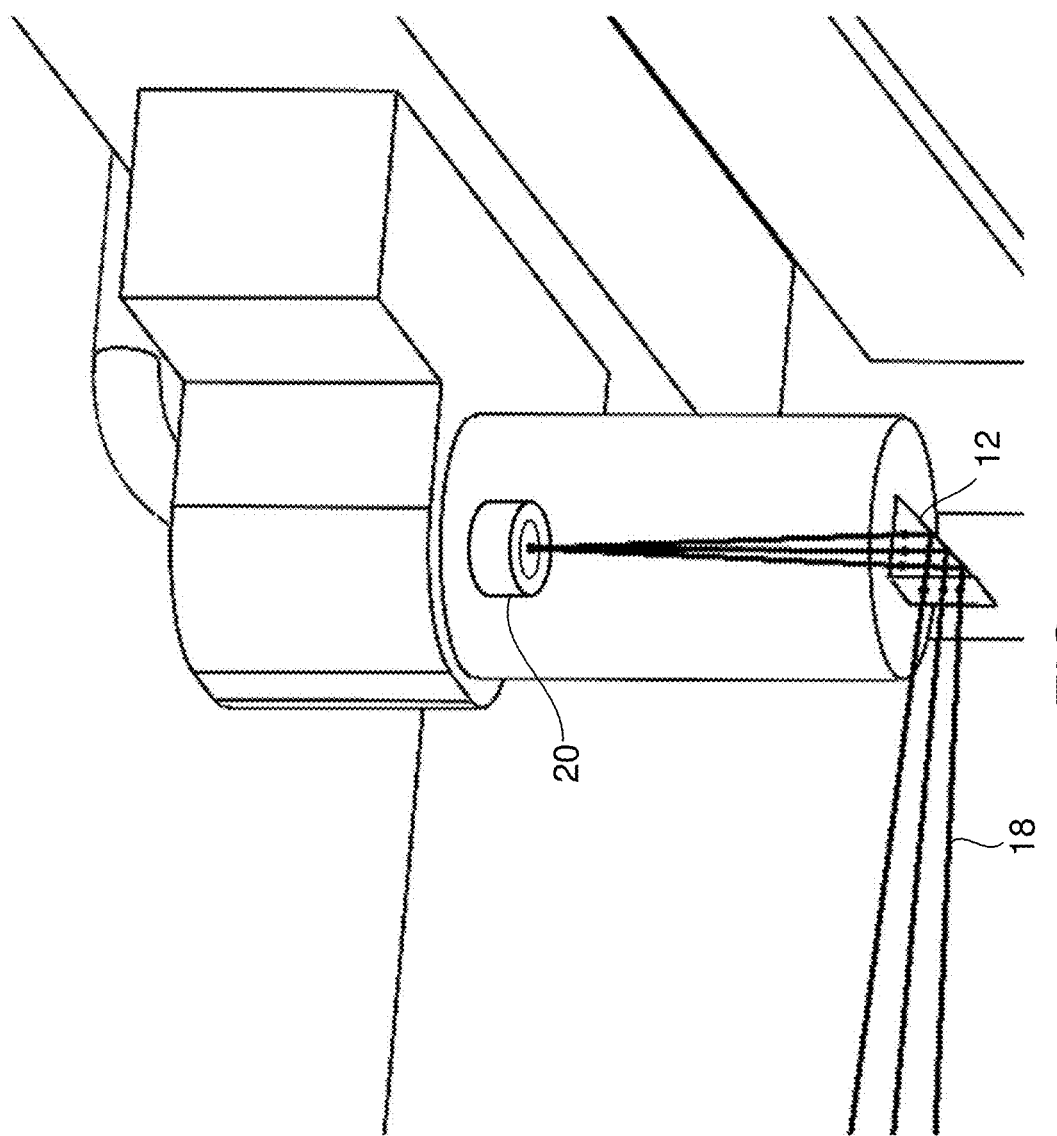
FIG. 4 is a partial bottom side perspective view of a mechanism of a present colorimeter for capturing marginal rays.

FIG. 1 is a top front perspective view of a present colorimeter 2. FIG. 2 is a side cross-sectional view of a present colorimeter 2, depicting an internal imaging path of the present colorimeter 2. FIG. 3 is a partial top side perspective view of the imaging portion of the present colorimeter 2. FIG. 4 is a partial bottom side perspective view of a mechanism of a present colorimeter 2 for capturing marginal rays 18. The colorimeter 2 is configured to receive central rays 16 and marginal rays 18 through an entrance pupil 6 of a barrel 4 and a lens system 14 disposed within the barrel 4 where the entrance pupil 6 is disposed at one end of the barrel 4 and it is pointed at a device having color outputs that need to be measured. The colorimeter includes an image sensor 10 and at least one optical device 12 all of which are disposed within a body 5 connected to the barrel 4. The image sensor 10 is configured for receiving the central rays 16 to produce a first image. A spectrometer is adapted to receive the marginal rays 18 to produce a second image. Although one optical device 12 suffices to provide an additional input to the present colorimeter, having a second optical device 12 adds to the information collected by the spectrometer. Shown herein are two optical devices 12, one disposed above the other, each configured to reflect at least a portion of the marginal rays 18 through a light path to the spectrometer, wherein the first image and the second image are aggregated to produce a total image that is more extensive than the first image. The term "image" as used herein shall refer to images and/or data received by the image sensor 10 and the spectrometer. In one example, the height 24 of the colorimeter is about 2.5 inches and the length 26 of the colorimeter is about 7.5 inches. In one example, the height 28 of the image sensor is about 0.26 inch and the spread 30 of the marginal rays is about 0.41 inch. The colorimeter is therefore compact and capable for use in applications with space limitations.

In one embodiment, the spectrometer is configured to receive the marginal rays 18 at a full field angle of up to about 10 degrees full field of view (FOV) directed by a suitably aligned prism or mirror 12 via the light path 20. In one embodiment, the at least one optical device can be a mirror or a prism, e.g., a microprism. In one embodiment, the light path 20 includes an optical fiber.

Figure 5:
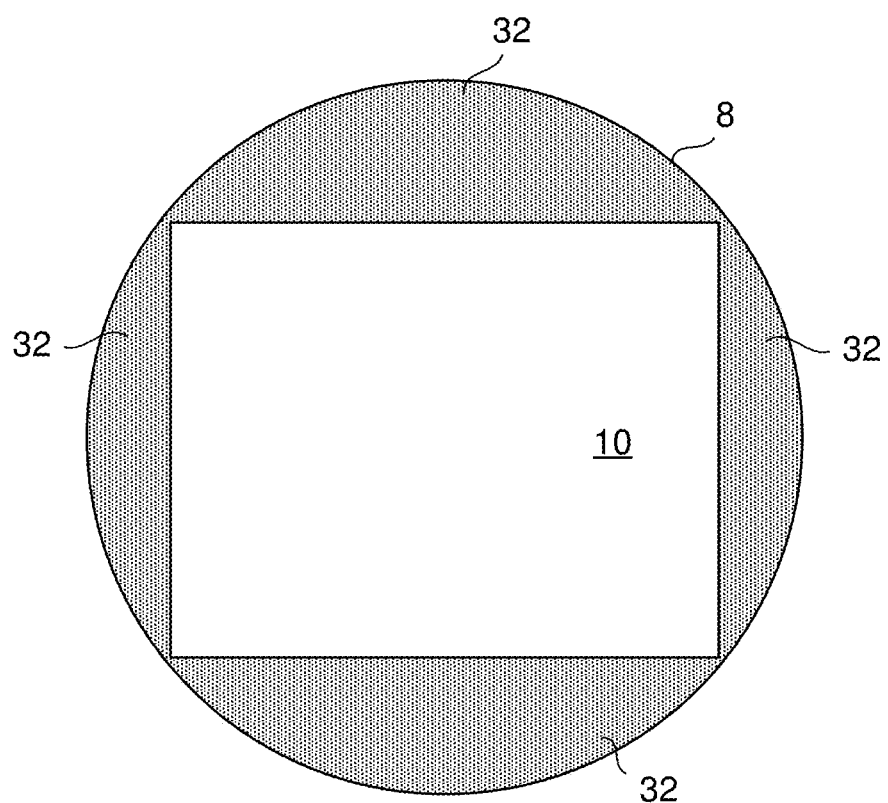
FIG. 5 is a diagram depicting differences both in the area and shape of a light transmitting area and a light receiving area of the present colorimeter.

FIG. 5 is a diagram depicting differences both in the area and shape of a light transmitting area and a light receiving area of the present colorimeter 2. Referring to FIGS. 1 and 3, it shall be noted that the entrance pupil 6 defines the angular resolution (or the diffraction limit) on the imaging plane (i.e., the light transmitting area) where both the imaging sensor and the collecting fiber are located.

Diffraction limit can be expressed as $\delta\theta=1.22\lambda/D$ where $\lambda$ is wavelength and D is the pupil diameter. Physically, the shape of the light transmitting area is different from the shape of the light receiving area. As such, the entrance pupil or aperture is not directly related to the transmitting area size or shape. In the embodiment shown, the shape of the light transmitting area is round as defined by the round entrance pupil 6 although it is possible to have an entrance of other shapes. Therefore, the view allowed by the entrance area is the entire area labelled part 8. In the embodiment shown, the shape of the light receiving area is rectangular as defined by the rectangular shape of the image sensor 10 although it is possible to have an image sensor of another shape. The present strategy in harvesting marginal rays can be applied to any set up as along as the light transmitting area allows light rays to enter an entrance pupil in a manner to cast marginal rays in an area outside of an area optically covered by an image sensor in an area 32 not normally imaged.

Figure 6:
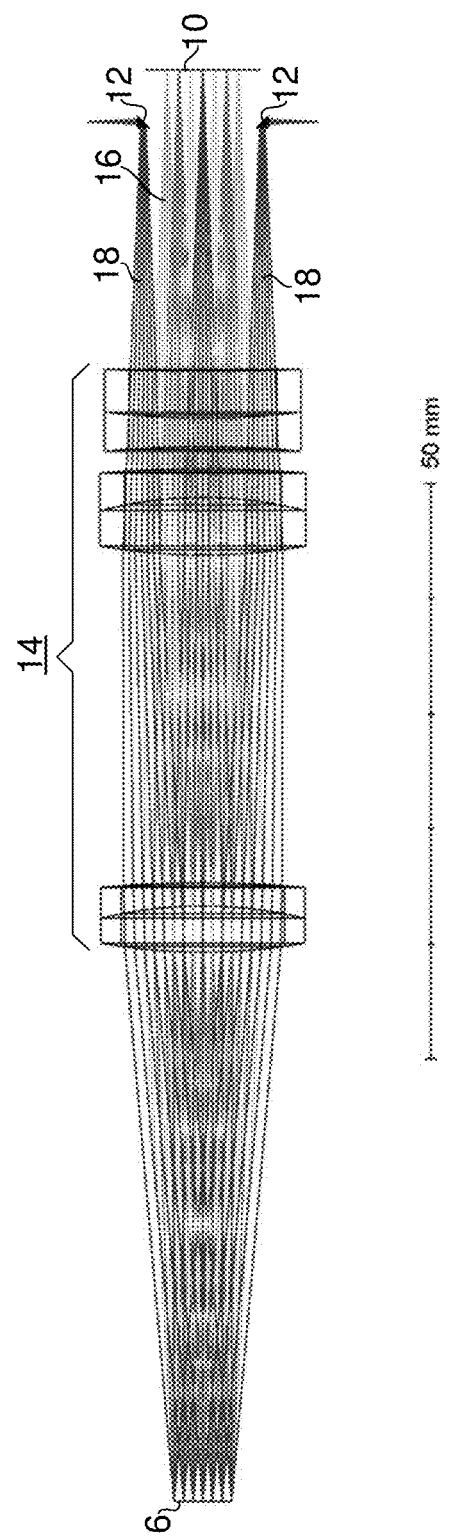
FIG. 6 is an optical path of a present colorimeter, depicting a light path from an entrance pupil to the imaging portion of the colorimeter and a manner in which marginal rays are directed.
Figure 7:
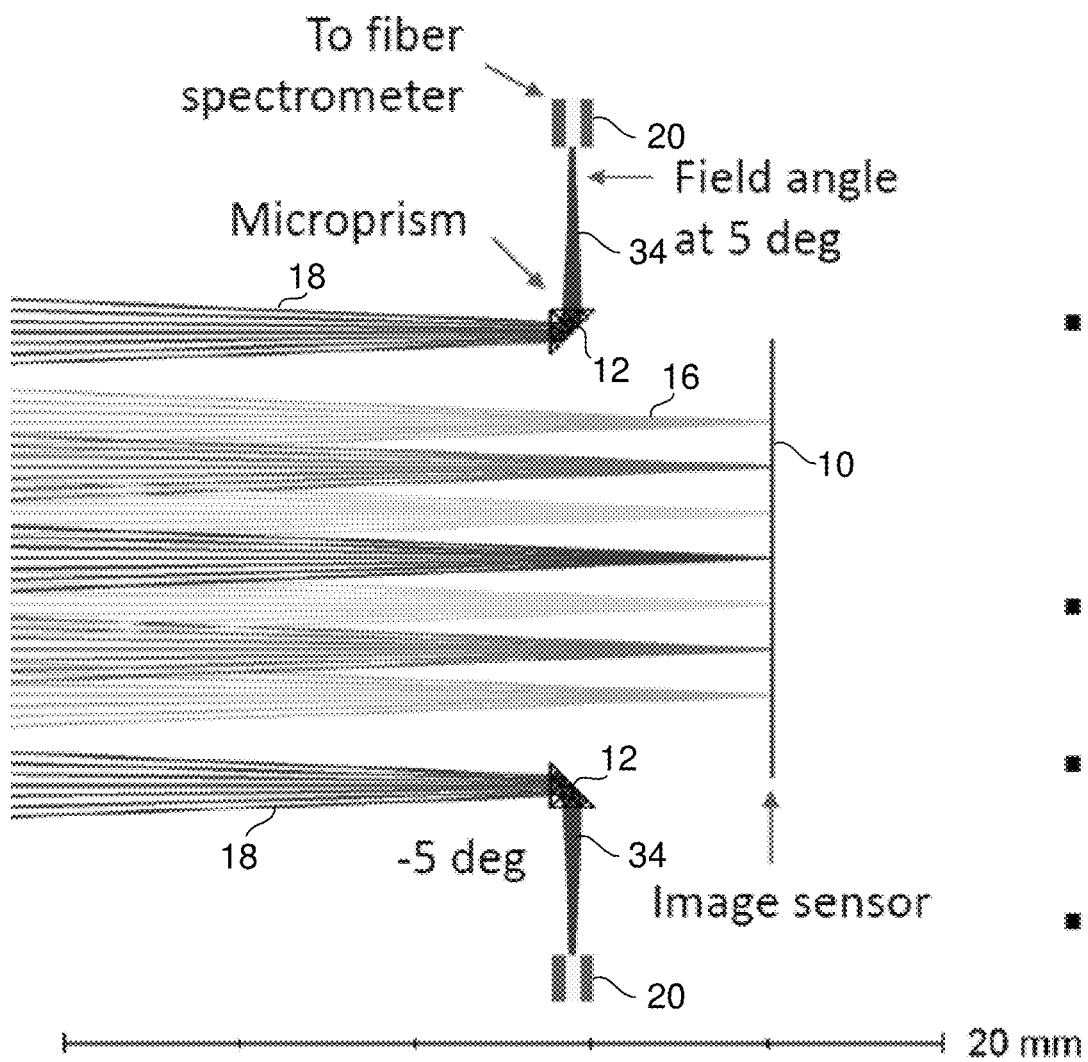
FIG. 7 is a partial side view of an optical path of a present colorimeter, depicting a light path at the imaging portion of the colorimeter and a manner in which marginal rays are directed.

FIG. 6 is an optical path of a present colorimeter, depicting a light path from an entrance pupil 6 to the imaging portion of the colorimeter 2 and a manner in which marginal rays 18 are directed. It shall be noted that the central rays 16 are directed to the image sensor 10 while the marginal rays 18 directed to the top of the central rays 16 get reflected outwardly from the image sensor 10 using a prism 12 and the marginal rays 18 directed to the bottom of the central rays 16 get reflected outwardly from the image sensor 10 using a prism 12. FIG. 7 is a partial side view of an optical path of a present colorimeter, depicting a light path at the imaging portion of the colorimeter and a manner in which marginal rays 18 are directed. It shall be noted that, upon redirection, each group of the marginal rays 34 is directed to a light path, e.g., an optical fiber to be received at a spectrometer.

Figure 8:
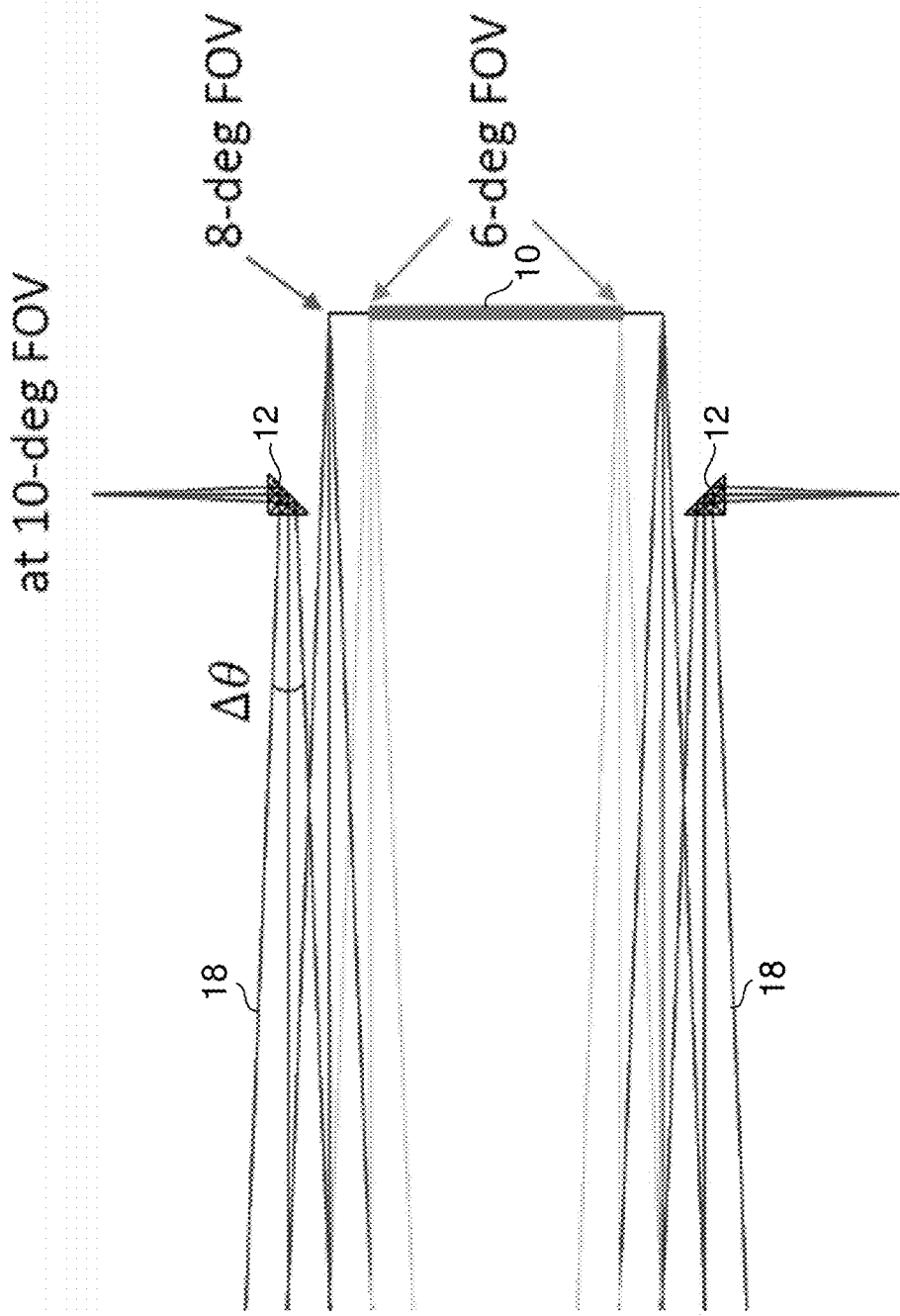
FIG. 8 is a partial side view of an optical path of a present colorimeter, depicting light rays disposed at various field angles that are received by the colorimeter in relation to the height of an image sensor.

FIG. 8 is a partial side view of an optical path of a present colorimeter, depicting light rays disposed at various field angles that are received by the colorimeter in relation to the height of an image sensor. The optical imaging FOV of the present colorimeter is about 6 degrees with a ½-inch sensor and can be extended to about 8 degrees using a larger ⅔-inch sensor with modulation transfer function (MTF) performance close to the diffraction limit. The virtual imaging distance (VID) range is from +/0.20 meter (+/5D) to infinity. The optical fiber collects light with a field of view of about 0.5 degree when VID changes from +/−0.2 meter to infinity, according to:

$$\Delta\theta=2*\text{atan}(A/(2*f))$$

Where A is the entrance pupil diameter which is 5 mm and f is focal length. As the acceptance angle of the optical fiber is at least 10 degrees (NA=0.1~0.5 for a multimode fiber) which is much larger than $\Delta\theta$, all light rays can be collected at different VIDs.

Figure 9:
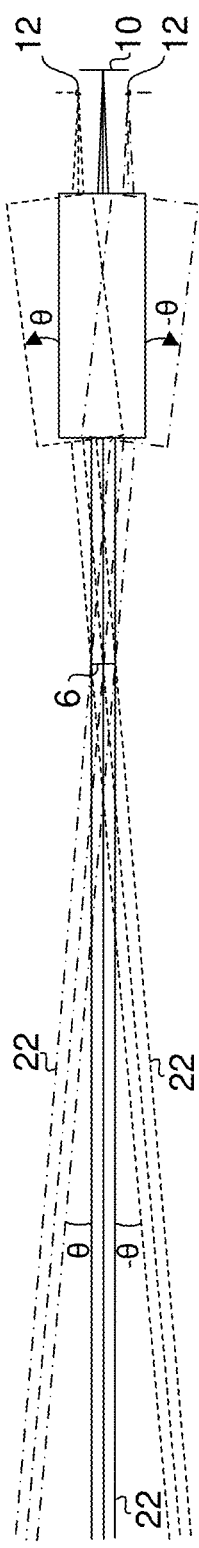
FIG. 9 is a partial side view of an optical path of a present colorimeter, depicting light rays disposed at various field angles that are received by the colorimeter.

FIG. 9 is a partial side view of an optical path of a present colorimeter, depicting incident light rays 22 disposed at various field angles θ that are received at the prisms 12 of the colorimeter 2. In one embodiment, the spectrometer is configured to receive the marginal rays at a field angle of up to about 10 degrees full FOV. As such, additional information can be obtained by way of the prisms and subsequently the spectrometer for color measurement and analysis. Note that without the prisms 12, only central light rays incident upon the entrance pupil 6 that assume full angular field of view of up to about 6 degrees (or 8 degrees with a larger sensor) can be cast onto the centrally placed image sensor 10. One or more prisms, e.g., microprisms or mirrors can be used to pick up one field angle, e.g., θ of about 5-10 degrees, or two field angles, e.g., θ of about 5-10 degrees and another field angle −θ at about 5-10 degrees or even more field angles around the image sensor to increase the sensitivity and accuracy of color measurements. The marginal light rays are configured to be sent to a calibrated fiber spectrometer or a spectroradiometer for color measurement and analysis. As the microprisms or mirrors move in concert with the image sensor 10 during focusing or changing of the VIDs, there are no further requirements for optical realignment.

In order to validate the design and configuration of the present compact MTF colorimeter, various simulations were carried out. Color representation and accuracy of the compact MTF colorimeter upon passing through the optical lens system, were verified. Further, color variations were compared at different FOV angles. Simulations were performed using light sources of a single wavelength or multiple wavelengths and white light. Specifications and features that may also be important include, but not limited to, light detection angles, imaging field of view, variable and consistent color collection angles, color mapping and imaging, coarse color scanning and mapping and colorimeter with high spatial resolution.

In one example, based on the simulation results as disclosed elsewhere herein, the color chromaticity (x, y) accuracy and the photometric value (Y) accuracy were both determined to be very good, indicating the optical lens system having an extremely small effect on the color distortion across various field angles. Compared to spectroradiometers, which are the most precise color measurement instruments, the accuracies produced using the present colorimeter are superior to those found using spectroradiometers. In general, commercially-available spectroradiometers come with key specification, e.g., color chromaticity accuracy of about 0.001 x, y and an accuracy photometric value of about 5%.

Figure 10:
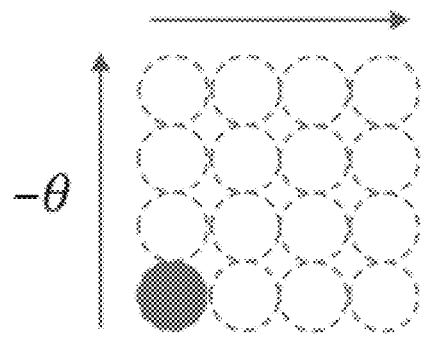
FIG. 10 depicts a region of interest (ROI) with a single-field scanning.
Figure 11:
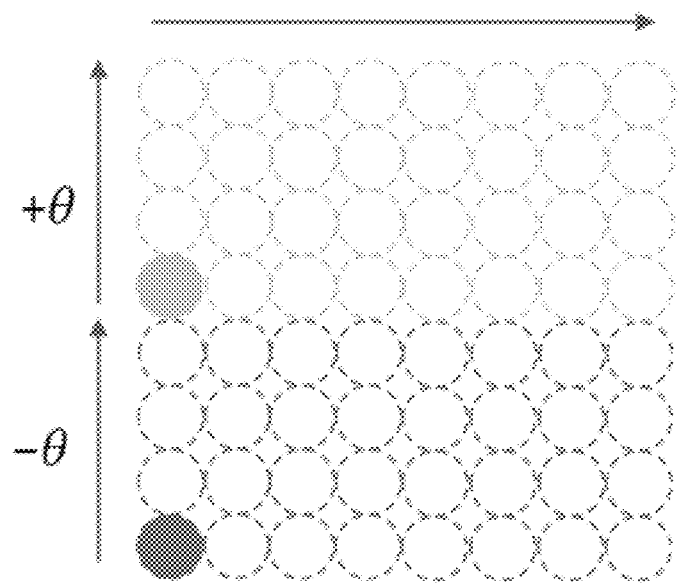
FIG. 11 depicts a region of interest (ROI) with a two-field scanning.

FIG. 10 depicts a region of interest (ROI) with a single-field scanning. FIG. 11 depicts an ROI with a two-field scanning. For coarse color scanning and mapping, as the lens is telecentric in image space, the angle θ keeps unchanged when the camera is focused at different VID locations. In other words, the camera can scan any ROI on the object with high angular accuracy. For example, the camera is rotated with a −θ-degree about the center of entrance pupil to enable the −θ-degree field direction pointing to the 0-degree field. An ROI is scanned using either single field as shown in FIG. 10 or multiple-field collections as shown in FIG. 11.

Figures 12, 13:
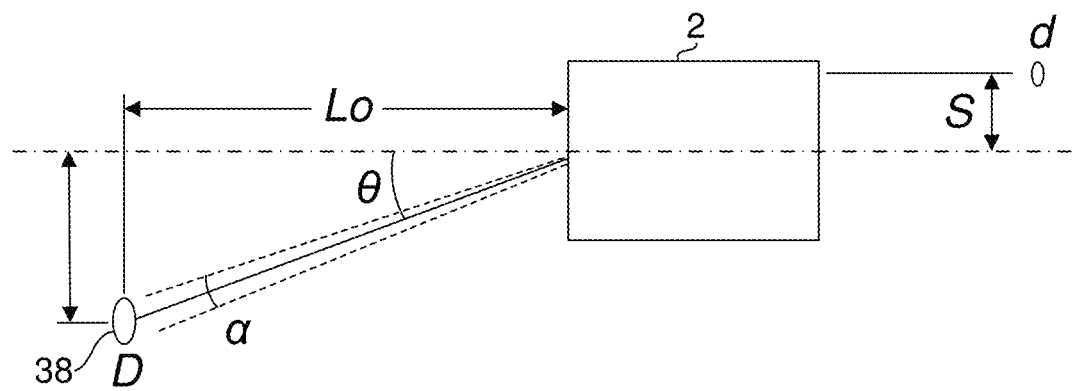
FIG. 12 depicts a fiber collection angle at object space.
FIG. 13 is a table showing fiber collection cone angles at different object distances (or VID values).

FIG. 12 depicts a fiber collection angle at object space. Assuming the fiber core 38 diameter of d and placed at θ=5 deg field angle, the area (diameter D) in object space where the light is collected by the camera module can be calculated using:

$$D = \frac{d}{S} \times L_o tg\theta$$

Where S is the distance of the chief ray at 5-degree field angle to the sensor center, $L_O$ is the object distance.

For example, if d=0.5 mm, S=5.174 mm, then the area D=1.691 mm, 4.227 mm, 8.455 mm, 16.909 mm, 42.273 mm with $L_O$=0.2 m, 0.5 m, 1 m, 2 m, 5 m.

For small aperture, the cone angle from the camera aperture to the area of object can be approximated as:

$$tg\,\alpha \approx \frac{D}{L_o}\cos^2\theta = \frac{d}{S}tg\theta \times \cos^2\theta$$

which is independent of $L_O$. The collection cone angle α≈0.480722621 degree for any VID values. As such, the cone angle is consistent with changing the VID.

The above calculation is valid only for long $L_O$ (large VID values) and small aperture. For small VID values, the aperture size may not be neglected. The cone angle should be revised as:

$$tg\,\alpha = \frac{D-A}{L_o}\cos^2\theta$$

Then, the variable collection cone angle at the object space can be calculated as shown in FIG. 13. It shall be noted that the change of cone angles is obvious for VID absolute value <5 m with 5 mm aperture. The angle change may be negligible with VID absolute value >5 m.

Figure 14:
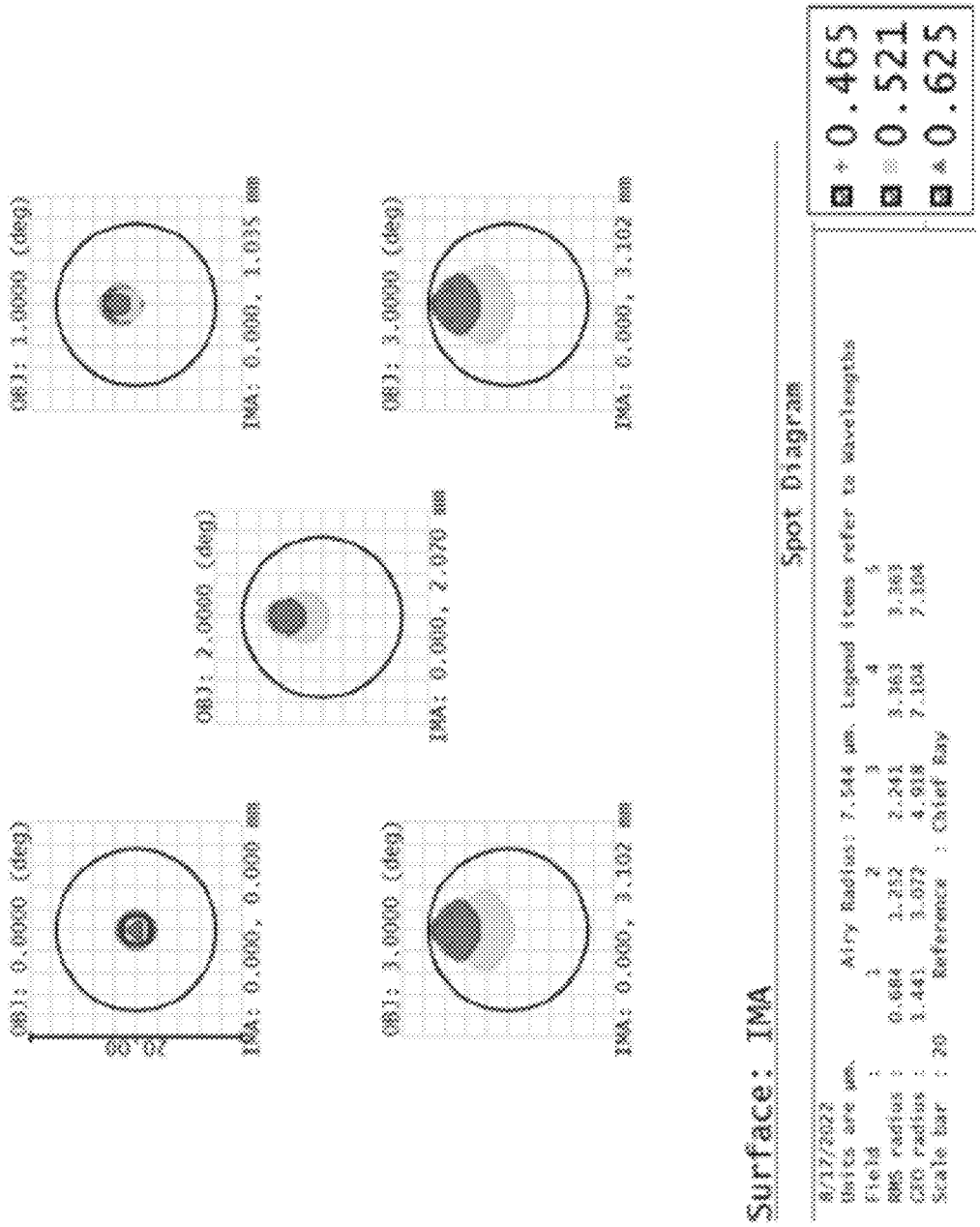
FIG. 14 depicts a spot diagram of the imaging lens, indicating all spot patterns from RGB wavelengths in the FOV are located inside the Airy disk (black circle) which is the diffraction limit.

The MTF and optics performance must also be evaluated. The lens is image space telecentric with imaging VID from 200 mm to infinity and near diffraction limit optical performance. The circles shown in a spot diagram of FIG. 14 represent the diffraction limit. Once light spots are disposed within these circles, the lens is said to have been configured properly. The image space telecentric lens does not suffer from radiometric $(\cos\theta)^{\wedge}4$ roll off illumination, since the rays land perpendicular to the sensor across its entire area. This is advantageous because it allows the image to have a more even relative illumination profile assuming selective vignetting has not been built into the lens design.

Figure 15:
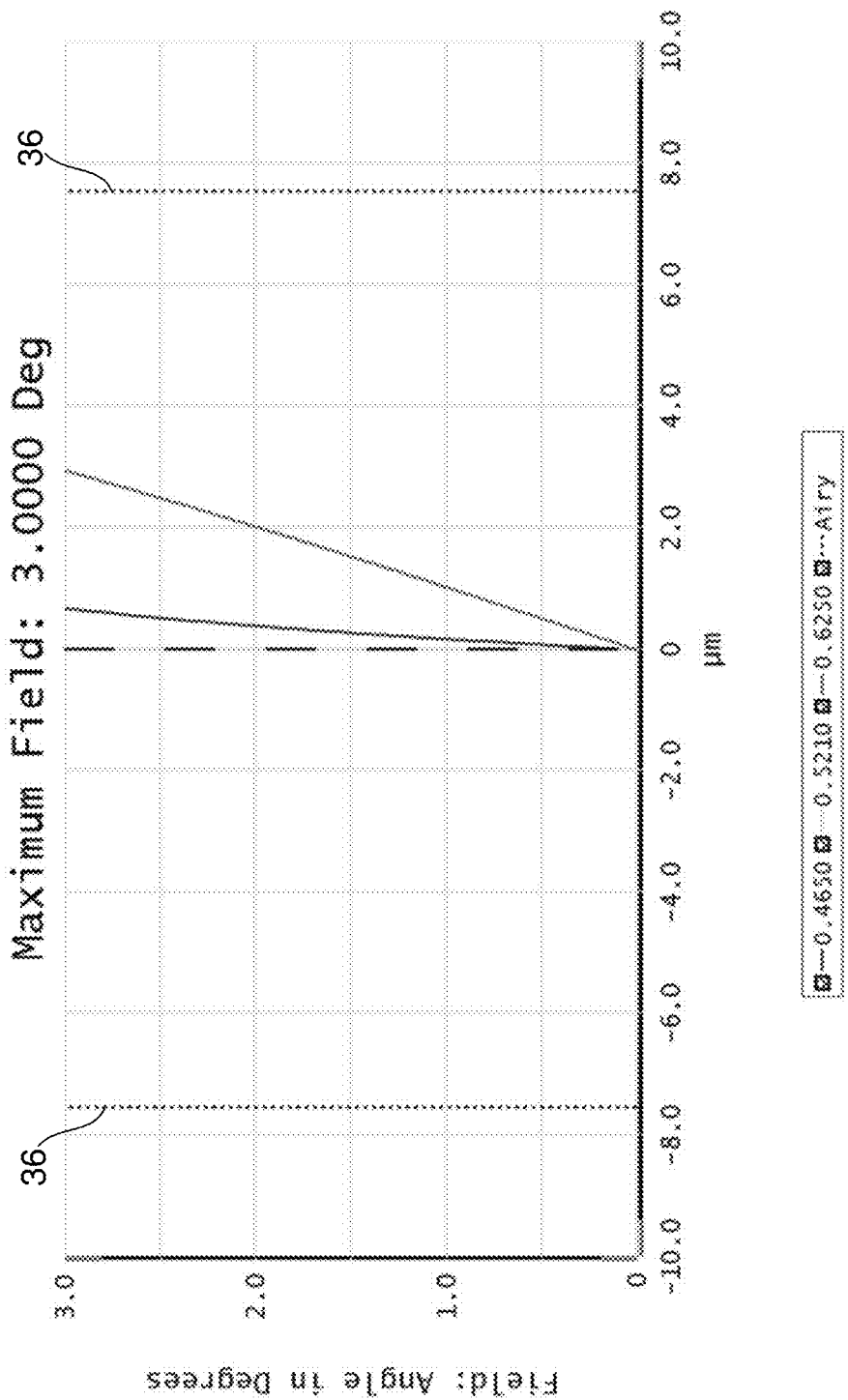
FIG. 15 depicts a lateral color diagram of the imaging lens, indicating chromatic aberration is negligible because all curves of different wavelengths in the FOV are located inside the Airy disk (two vertical dash lines) which is the diffraction limit.

FIG. 14 depicts a spot diagram of the imaging lens, indicating all spot patterns from RGB wavelengths in the FOV are located inside the Airy disk (black circle) which is the diffraction limit. For MTF measurements, the lens performance should be as close as possible so that the lens can be used to measure other samples, such as augmented reality/virtual reality (AR/VR) glasses. FIG. 15 is a diagram depicting the lateral color of the imaging lens, indicating chromatic aberration is negligible because all curves of different wavelengths in the FOV are located inside the two vertical lines 36 which represent the diffraction limit.

Coarse color mapping can produce a precise color measurement for an ROI on the object, but it has relatively low spatial resolution. A colorimeter imaging with higher spatial resolution can be achieved by using a conventional color camera sensor. The chromaticity and photometric value can be calibrated by the correction matrix R.

$$R = \begin{bmatrix} X_r & X_g & X_b \\ Y_r & Y_g & Y_b \\ Z_r & Z_g & Z_b \end{bmatrix} \times \begin{bmatrix} R_r & R_g & R_b \\ G_r & G_g & G_b \\ B_r & B_g & B_b \end{bmatrix}$$

Here, Xi Yi Zi are the tristimulus values based on the CIE's color matching functions for a color (i=red, green and blue) with a spectral radiance detected by the fiber spectrometer. Ri Gi Bi are the response from color CCD sensor RGB output channels under light of different colors (i). Then the measured RGB values can be converted from a color camera to the tristimulus values:

$$\begin{bmatrix} X \\ Y \\ Z \end{bmatrix} = R \times \begin{bmatrix} R \\ G \\ B \end{bmatrix}$$

Since the conversion is based on a spectroradiometer calibration which can be performed in real time for different targets such as different displays, AR/VR glass, waveguides and microLED panels, the color measurements are comparable to or better than XYZ filter-based colorimeters.

FIG. 16 depicts properties of a lens that is telecentric in imaging space. As shown in FIG. 16, the image size of semi-diameter keeps almost unchanged when the VID is changed, indicating that the lens is imaging-space telecentric.

FIG. 17 depicts a color simulation using ZEMAX® software with single wavelength. A light source of single wavelength is detected by the color detector after passing through the lens. The color accuracy is obtained by comparing the chromaticity and luminance values between the light source and the color detector. The simulation results indicate that the color accuracy is extremely high or the color difference is extremely small for various single wavelengths. The simulation also shows that the results are the same for different field angles.

FIG. 18 depicts results of D65 simulation using ZEMAX® software with RGB wavelengths as color primaries. A light source of mixing three wavelengths to match the D65 white point is detected by the color detector after passing through the lens. The color accuracy is obtained by comparing the chromaticity and luminance values between the light source and the color detector. The simulation results indicate that the color accuracy is very high for different field angles.

FIG. 19 depicts results of D65 simulation using ZEMAX® with a broadband spectrum. A light source using a broadband spectrum to match the D65 white point is detected by the color detector after passing through the lens. The color accuracy is obtained by comparing the chromaticity and luminance values between the light source and the color detector. The simulation results indicate that the color accuracy is very high for different field angles.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A colorimeter configured to receive central rays and marginal rays, wherein the marginal rays fall outside of the central rays, said colorimeter comprising:
(a) an image sensor configured for receiving the central rays to produce a first image;
(b) at least one optical device configured to reflect at least a portion of the marginal rays through a light path to a spectrometer to produce a second image; and
(c) an entrance pupil having a light transmitting area and said image sensor comprises a light receiving area, wherein the shape of said light transmitting area is different from the shape of said light receiving area,
wherein said first image and said second image are aggregated to produce a total image that is more extensive than said first image.

2. The colorimeter of claim 1, wherein the spectrometer is configured to receive the marginal rays at a field angle of up to about 10 degrees field of view (FOV).

3. The colorimeter of claim 1, wherein said at least one optical device is a device selected from the group consisting of a mirror and a prism.

4. The colorimeter of claim 1, wherein said light path comprises an optical fiber.

5. The colorimeter of claim 1, wherein the shape of said light transmitting area is round and the shape of said light receiving area is rectangular.

6. A colorimeter configured to receive central rays and marginal rays, wherein the marginal rays fall outside of the central rays, said colorimeter comprising:
(a) an image sensor configured for receiving the central rays to produce a first image; and
(b) at least one optical device configured to reflect at least a portion of the marginal rays through a light path to a spectrometer to produce a second image,
wherein the spectrometer is adapted to receive the marginal rays at a field angle of up to about 10 degrees field of view (FOV), extending a total image that is more extensive than said first image.

7. The colorimeter of claim 6, wherein said at least one optical device is a device selected from the group consisting of a mirror and a prism.

8. The colorimeter of claim 6, wherein said light path comprises an optical fiber.

9. The colorimeter of claim 6, wherein said colorimeter comprises an entrance pupil having a light transmitting area and said image sensor comprises a light receiving area, wherein the shape of said light transmitting area is different from the shape of said light receiving area.

10. The colorimeter of claim 9, wherein the shape of said light transmitting area is round and the shape of said light receiving area is rectangular.

* * * * *